(12) United States Patent
Hart et al.

(10) Patent No.: US 7,948,900 B2
(45) Date of Patent: May 24, 2011

(54) METHOD AND SYSTEM FOR VERIFYING CONNECTIVITY OF MULTI-SEGMENT PSEUDO-WIRES

(75) Inventors: Neil Hart, Chelsea (CA); Tiberiu Grigoriu, Ottawa (CA); Mustapha Aissaoui, Kanata (CA)

(73) Assignee: Alcatel Lucent, Paris (FR)

(*) Notice: Subject to any disclaimer, the term of this patent is extended or adjusted under 35 U.S.C. 154(b) by 929 days.

(21) Appl. No.: 11/798,086

(22) Filed: May 10, 2007

(65) Prior Publication Data

US 2008/0279110 A1    Nov. 13, 2008

(51) Int. Cl.
*H04J 1/16* (2006.01)
*H04L 12/26* (2006.01)

(52) U.S. Cl. ......................... 370/238

(58) Field of Classification Search ............... None
See application file for complete search history.

(56) References Cited

U.S. PATENT DOCUMENTS 7,463,591 B1 * 12/2008 Kompella et al. ............. 370/248
7,486,622 B2 *  2/2009 Regan et al. .................. 370/236

OTHER PUBLICATIONS

Andersson, L., et al., "Standards Track: LDP Specification", Request for Comments 3036, The Internet Society, Jan. 2001, pp. 1-118.
Thomas, B., et al., "Informational: LDP Applicability", Request for Comments: 3037, The Internet Society, Jan. 2001, pp. 1-7.
Martini, L., et al., "Standards Track: Pseudowire Setup and Maintenance Using the LDP", Request for Comments 4447, The Internet Society, Apr. 2006, pp. 1-30.
Hart Neil, et al., "Internet Drafting: Segmented Pseudo Wire VCCV", draft-hart-pwe3-segmented-pw-vccv-00.txt, Jun. 2006, pp. 1-6.

* cited by examiner

*Primary Examiner* — Raj K Jain
(74) *Attorney, Agent, or Firm* — Kramer & Amado, P.C.

(57) ABSTRACT

A method for testing connectivity of a multi-segment pseudo-wire ("MS-PW") in a network, the method comprising: sending an echo request message from a first provider edge ("PE") device to a second provider edge ("PE") device for a section of the multi-segment pseudo-wire ("MS-PW") between the first provider edge ("PE") device and the second provider edge ("PE") device; the echo request message being identified as such by a control word contained therein; an inner label of the echo request message having a time-to-live ("TTL") value set to a number of segments in the section; the time-to-live ("TTL") value for determining whether the control word is to be inspected as it traverses the section; upon the echo request message arriving at the second provider edge ("PE") device, the second provider edge ("PE") device recognizing the echo request message as such by inspecting the control word contained therein; and, receiving an echo reply message from the second provider edge ("PE") device in response to the echo request message, the echo reply message confirming connectivity of the section.

20 Claims, 3 Drawing Sheets

METHOD AND SYSTEM FOR VERIFYING CONNECTIVITY OF MULTI-SEGMENT PSEUDO-WIRES

FIELD OF THE INVENTION

This invention relates to the field of network management and service provisioning, and more specifically, to a method and system for verifying connectivity for multi-segment pseudo-wires in packet switched networks.

BACKGROUND OF THE INVENTION

Multiprotocol label switching ("MPLS") provides a mechanism for engineering network traffic patterns in which short labels are assigned to network packets that describe how to forward them through a network (e.g., a packet switched network ("PSN")). In a MPLS network, a node, switch or router which supports MPLS is generally known as a label switching router ("LSR") and a LSR at the edge (ingress or egress) of the MPLS network is generally known as a label edge router ("LER").

In general, as a data frame of a connectionless network layer protocol (e.g., the Internet Protocol ("IP")) travels from a source node to a destination node it travels from one node to the next through the network. Each node makes an independent forwarding decision for that packet. That is, each node analyzes the data frame's header to determine where to forward the packet next. The forwarding decision is determined by a forwarding table that is present on each node and that is built by network layer routing algorithms running on that node. Therefore each router independently chooses a next hop for the data frame, based on its analysis of the packet's header and the results of running the routing algorithm.

Frame headers contain considerably more information than is needed simply to choose the next hop along the path. Choosing the next hop can therefore be thought of as the combination of two functions. The first function partitions the entire set of possible packets into a set of forwarding equivalence classes ("FECs"). In conventional IP forwarding, the FEC is a subnet IP address prefix. Therefore, a particular node will typically consider two packets to be in the same FEC if there is some address prefix "X" in that router's routing tables such that "X" is the "longest match" for each packet's destination address. The second function maps each FEC to a next hop. Insofar as the forwarding decision is concerned, different packets which get mapped into the same FEC are indistinguishable. All data frames which belong to a particular FEC and which travel from a particular node will follow the same path (or if certain kinds of multi-path routing are in use, they will all follow one of a set of paths associated with the FEC). As the data frame traverses the network, each hop in turn re-examines the packet and matches it to a FEC in order to determine the next hop.

In MPLS, the assignment of a particular data frame to a particular FEC is done just once, as the data frame enters the network. The FEC to which the packet is assigned is encoded as a short fixed length value known as a "label". When a packet is forwarded to its next hop, the label is sent along with it; that is, the packets are "labelled" before they are forwarded. At subsequent hops, there is no further analysis of the data frame's network layer header. Rather, the label in the frame header is used as an index into a table on the node. The table entry specifies the next hop and a new label. The old label in the frame header is replaced with the new label and the data frame is forwarded to its next hop. Thus, in the MPLS forwarding paradigm, once a packet is assigned to a FEC, no further network layer header analysis is done by subsequent routers; all forwarding is driven by the labels.

For reference, the MPLS header is made up of a stack of 32 bit labels. The MPLS "label" is 20 bits long and is the identifier that is locally significant to the LSR. The "experimental bits" field is 3 bits long and is used to determine the quality of service ("QoS") that is to be applied to the data frame. The "stack" field takes one bit and is used to determine whether there is another label stack entry in the header. And, the time-to-live ("TTL") field is 8 bits long and is similar to the TTL field carried in the IP header and is used to determine how many hops the frame can traverse. The IP frame is encapsulated with an MPLS header at the ingress edge of the MPLS network. At the egress edge, the IP frame is restored by removing the MPLS header.

The label distribution protocol ("LDP") is used to build and maintain MPLS label databases that are used to forward traffic through MPLS networks. The LDP is specified in Internet Engineering Task Force ("IETF") documents request for comment ("RFC") 3036, "LDP Specification", January 2001, and RFC 3037, "LDP Applicability", January 2001, which are incorporated herein by reference. As mentioned above, MPLS is a method for forwarding packets that uses short, fixed-length values carried by packets, called labels, to determine packet next hops. A fundamental concept in MPLS is that two LSRs must agree on the meaning of the labels used to forward traffic between and through them. This common understanding is achieved by using a set of procedures (i.e., the LDP) by which one LSR informs another of label bindings it has made. Thus, the LDP is a set of procedures by which one LSR informs another of the meaning of labels used to forward traffic between and through them.

Now, a pseudo-wire (or pseudowire or "PW") is an emulation of a native service over a packet switched network ("PSN"). The native service may be asynchronous transfer mode ("ATM"), Frame Relay, Ethernet, low-rate time-division multiplexing ("TDM"), or synchronous optical network/synchronous digital hierarchy ("SONET/SDH"), while the PSN may be a MPLS, IP, or Layer 2 tunnelling protocol ("L2TP") based network. The PW emulates the operation of a "transparent wire" carrying the native service. In other words, a PW emulates a point-to-point link and provides a single service which is perceived by its user as an unshared link or circuit of the chosen service.

In general, a PW is a connection between two provider edge ("PE") devices which connects two attachment circuits ("ACs"). An AC can be a Frame Relay data link connection identifier ("DLCI"), an ATM virtual path identifier/virtual channel identifier ("VPI/VCI"), an Ethernet port, a virtual local area network ("VLAN"), a high-level data link control ("HDLC") link, a point-to-point protocol ("PPP") connection on a physical interface, a PPP session from an L2TP tunnel, an MPLS label switched path ("LSP"), etc. During the setup of a PW, the two PEs will be configured or will automatically exchange information about the service to be emulated so that later they know how to process packets coming from the other end. After a PW is set up between two PEs, frames received by one PE from an AC are encapsulated and sent over the PW to the remote PE, where native frames are re-constructed and forwarded over the other AC. The PE devices may be, for example, MPLS switches, LERs, or LSRs.

PW extensions to the LDP are described in IETF document RFC 4447, "Pseudowire Setup and Maintenance Using the Label Distribution Protocol (LDP)", April 2006, which is incorporated herein by reference. According to RFC 4447, Layer 2 services (such as Frame Relay, ATM, and Ethernet) can be "emulated" over an MPLS backbone by encapsulating the Layer 2 protocol data units ("PDUs") and transmitting them over PWs. In other words, PWs are created to carry different types of traffic across a MPLS network, the PW being a point-to-point network connection over MPLS that offers transparency of the Layer 2 service which it transports.

RFC 4447 specifies a protocol for establishing and maintaining PWs, using extensions to the LDP. It defines new type-length-values ("TLVs"), FEC elements, parameters, and codes for LDP, which enable LDP to identify PWs and to signal attributes of PWs. It specifies how a PW endpoint uses these TLVs in LDP to bind a demultiplexor field value (i.e., an MPLS label as described above) to a PW, and how it informs the remote endpoint of the binding. It also specifies procedures for reporting PW status changes, for passing additional information about the PW as needed, and for releasing the bindings.

Consider the following RFC 4447 scenario. Suppose that it is desired to transport Layer 2 PDUs from ingress LSR $PE_1$, to egress LSR $PE_2$, across an intervening MPLS-enabled network. Assume that there is an MPLS tunnel from $PE_1$, to $PE_2$. That is, assume that $PE_1$ can cause a packet to be delivered to $PE_2$ by encapsulating the packet in an "MPLS tunnel header" and sending the result to one of its adjacencies. The MPLS tunnel is a MPLS label switched path ("LSP"); thus, putting on an MPLS tunnel encapsulation is a matter of pushing on an MPLS label. Also suppose that a large number of PWs can be carried through a single MPLS tunnel. Thus, it is never necessary to maintain state in the network core for individual PWs. It is not presupposed that the MPLS tunnels are point-to-point; although the PWs are point-to-point, the MPLS tunnels may be multipoint-to-point. It is not presupposed that $PE_2$ will even be able to determine the MPLS tunnel through which a received packet was transmitted. (For example, if the MPLS tunnel is an LSP and penultimate hop popping is used, when the packet arrives at $PE_2$ it will contain no information identifying the tunnel.) When $PE_2$ receives a packet over a PW, it must be able to determine that the packet was in fact received over a PW, and it must be able to associate that packet with a particular PW. $PE_2$ is able to do this by examining the MPLS label that serves as the PW demultiplexor field. This label may by called the "PW label". When $PE_1$ sends a Layer 2 PDU to $PE_2$, it creates an MPLS packet by adding the PW label to the packet, thus creating the first entry of the label stack. If the PSN tunnel is an MPLS LSP, the $PE_1$ pushes another label (i.e., the tunnel label) onto the packet as the second entry of the label stack. The PW label is not visible again until the MPLS packet reaches $PE_2$. $PE_2$'s disposition of the packet is based on the PW label.

Thus, a PW is a point-to-point connection across an MPLS network identified by a stack of two labels. The first label is called the "outer" label. It represents the outer tunnel, or outer LSP. This outer tunnel is needed to transport the packets across the network. Within this outer tunnel, "inner" connections (i.e., PWs) may be multiplexed. Each of these inner connections is identified by a second label, usually called the "inner" label. The outer tunnel is usually signalled (i.e., labels exchanged, etc.) using a protocol such as LDP or the resource reservation protocol-traffic extension ("RSVP-TE"). The inner connection (i.e., the PW) is signalled using LDP in its downstream unsolicited ("DU") mode (i.e., "LDP-DU"). When LDP-DU mode is engaged, a LSR (e.g., a MPLS switch) can distribute MPLS label bindings to other LSRs that have not explicitly requested them. This label management behavior is described in RFC 3036. Thus, the MPLS LDP-DU signalling protocol with PW extensions is thus used to establish bidirectional PWs across a MPLS network.

The PWs referred to above may also be referred to as single-segment pseudo-wires ("SS-PWs") as they are setup directly between two terminating PEs ("T-PEs"). Each direction of the SS-PW traverses one PSN tunnel that connects the two T-PEs. Thus, a T-PE is a PE where the customer-facing attachment circuits ("ACs") are bound to a PW forwarder. A PW may also have a number of segments. Such a PW may be referred to as a multi-segment pseudo-wire ("MS-PW"). Thus, a MS-PW is a static or dynamically configured set of two or more contiguous PW segments that behave and function as a single point-to-point PW. Each end of a MS-PW by definition terminates on a T-PE. That is, a T-PE is present in the first and last segments of a MS-PW. PEs located between T-PEs on a MS-PW are referred to as switching PEs ("S-PEs"). A S-PE is a PE capable of switching the control and data planes of the preceding and succeeding PW segments in a MS-PW. The S-PE terminates the PSN tunnels transporting the preceding and succeeding segments of the MS-PW. It is therefore a PW switching point for a MS-PW. A PW switching point is never the S-PE and the T-PE for the same MS-PW. A PW switching point runs necessary protocols to setup and manage PW segments with other PW switching points and T-PEs.

Now, as service providers ("SPs") deploy PW services, fault detection and diagnostic mechanisms particularly for the PSN portion of the network are becoming increasingly important. Specifically, the ability to provide end-to-end fault detection and diagnostics for an emulated PW service is an important consideration for SPs. The term virtual circuit connection verification ("VCCV") has been used to refer to a control channel that is associated with a SS-PW and to the corresponding operations and management functions such as connectivity verification to be used over that control channel. In general, VCCV defines a set of messages that are exchanged between PEs to verify connectivity of the SS-PW. To make sure that VCCV packets follow the same path as the SS-PW data flow, they are typically encapsulated with the same SS-PW demultiplexer and transported over the same PSN tunnel. For example, if MPLS is the PSN in use, then the same label shim header (and label stack) are typically incorporated. VCCV can be used both as a fault detection and/or a diagnostic tool for SS-PWs. An operator can periodically invoke VCCV for proactive connectivity verification on an active SS-PW, or on an ad hoc or as-needed as a means of manual connectivity verification. When invoking VCCV, the operator triggers a combination of one of its various connectivity check ("CC") types and one of its various connectivity verification ("CV") types. These include label switched path ("LSP"), L2TP, or Internet control message protocol ("ICMP") ping modes and are applicable depending on the underlying PSN. For reference, the term "ping" refers to an operation that may be used to test connectivity in a network. A ping operation sends an echo request packet to an address, and then awaits a reply. The result of the ping operation can help SPs evaluate path-to-host reliability, delays over the path, and whether the host can be reached or is functioning. For example, a ping operation may be is based on ICMP traffic and may use public routing tables in order to get to the required destination (if it exists). For reference, IETF document RFC 4379, "Detecting Multi-Protocol Label Switched (MPLS) Data Plane Failures", February 2006, which is incorporated herein by reference, describes MPLS "echo requests" and "echo replies" for the purposes of fault detection and isolation for MPLS label switched paths ("LSPs").

However, for new MS-PW services, methods to easily pinpoint the point of failure and verify the end-to-end connectivity of a MS-PW are deficient. While VCCV allows SPs to test the forwarding datapath of SS-PW services, as PW service is to extended to MS-PWs, it is important to maintain the facility to verify the forwarding datapath both end-to-end and for intermediate PW segments. In particular, one problem with present MS-PW networks is that as VCCV packets follow the same path as data packets, it is up to each processing node (e.g., PE device) to identify the VCCV packets. This consumes processing capacity and time at each processing node. The ability to minimize the processing time for each data packet is important for maintaining the line rate for traffic through the overall network.

A need therefore exists for an improved method and system for verifying connectivity of multi-segment pseudo-wires connections in packet switched networks. Accordingly, a solution that addresses, at least in part, the above and other shortcomings is desired.

SUMMARY OF THE INVENTION

According to one aspect of the invention, there is provided a method for testing connectivity of a multi-segment pseudo-wire ("MS-PW") in a network, the method comprising: sending an echo request message from a first provider edge ("PE") device to a second provider edge ("PE") device for a section of the multi-segment pseudo-wire ("MS-PW") between the first provider edge ("PE") device and the second provider edge ("PE") device; the echo request message being identified as such by a control word contained therein; an inner label of the echo request message having a time-to-live ("TTL") value set to a number of segments in the section; the time-to-live ("TTL") value for determining whether the control word is to be inspected as it traverses the section; upon the echo request message arriving at the second provider edge ("PE") device, the second provider edge ("PE") device recognizing the echo request message as such by inspecting the control word contained therein; and, receiving an echo reply message from the second provider edge ("PE") device in response to the echo request message, the echo reply message confirming connectivity of the section.

In the above method, the inner label may be an inner pseudo-wire ("PW") label. The echo request message may have an outer tunnel label for traversing the network. The control word may be a virtual circuit connectivity verification ("VCCV") control word. The time-to-live ("TTL") value may be decremented upon traversing each segment of the section of the multi-segment pseudo-wire ("MS-PW"). The first provider edge ("PE") device may be a first terminating provider edge ("T-PE") device. The second provider edge ("PE") device may be a second terminating provider edge ("T-PE") device. The time-to-live ("TTL") value may be set to a number that is greater than or equal to the number of segments in the section of the multi-segment pseudo-wire ("MS-PW"). The second provider edge ("PE") device may be a switching provider edge ("S-PE") device. And, the time-to-live ("TTL") value may be set to a number that is less than the number of segments in the section and the control word may be inspected by the switching provider edge ("S-PE") device if the time-to-live ("TTL") value is decremented to zero at the switching provider edge ("S-PE") device.

In accordance with further aspects of the present invention there is provided an apparatus such as a data processing system (e.g., a MPLS router or switch, a network element, a network management system, etc.), a method for adapting this system, as well as articles of manufacture such as a computer readable medium having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the network nodes, network elements, and network management systems described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

Figure 1:
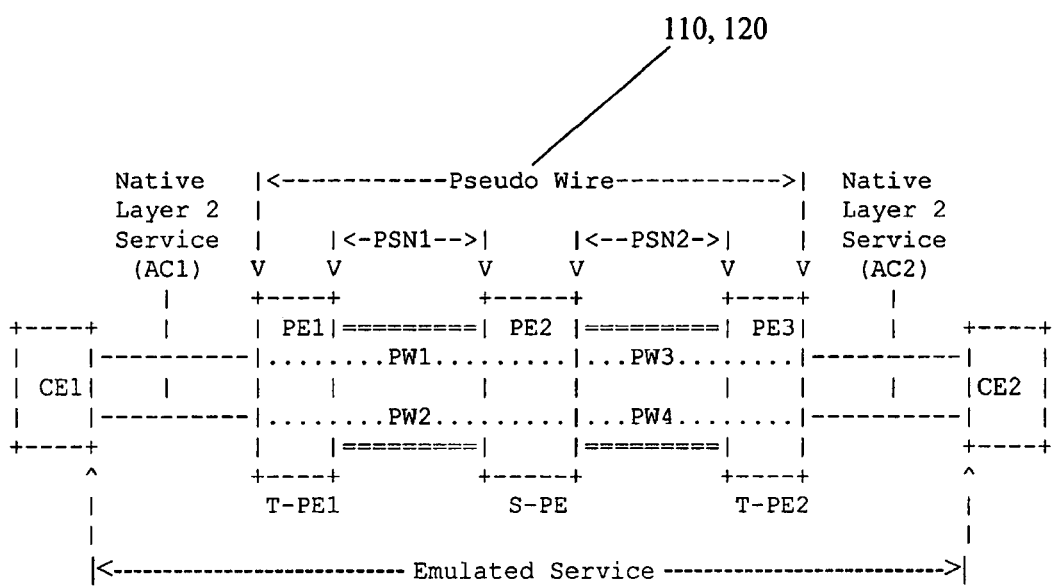
FIG. 1 is a block diagram illustrating a multi-segment pseudo-wire based communications network in accordance with an embodiment of the invention.

FIG. 1 is a block diagram illustrating a multi-segment pseudo-wire based communications network 100 in accordance with an embodiment of the invention. The communications network (or system) 100 includes a first provider edge ("PE") device PE1 coupled to a second PE device PE2 over a first packet switched network ("PSN") PSN1 via a first pseudo-wire ("PW") segment PW1. In addition, the second PE device PE2 is coupled to a third PE device PE3 over a second PSN network PSN1 via a third PW segment PW3. Customer edge ("CE") devices CE1, CE2 are coupled to respective PE devices PE1, PE3 by respective attachment circuits ("ACs") AC1, AC2. The PSN networks PSN1, PSN2 may be MPLS networks, IP networks, etc. The PE devices PE1, PE2, PE3 may be MPLS switches, nodes, elements, switches, routers, etc. The PE devices PE1, PE2, PE3 may be maintained by at least one service provider ("SP") to provide Layer 2 services to a subscriber or user via the CE devices CE1, CE2. According to one embodiment, the PE devices PE1, PE2, PE3 may be coupled to a network management system ("NMS") (not shown) for controlling and monitoring purposes. The NMS may be located at the SP's central office ("CO") or elsewhere.

Thus, PE1 and PE3 provide PW service to CE1 and CE2 and may be referred to as terminating PEs ("T-PEs") T-PE1, T-PE2. These PEs reside in different PSN domains, PSN1 and PSN2, respectively. A PSN tunnel extends from PE1 to PE2 across PSN1, and a second PSN tunnel extends from PE2 to PE3 across PSN2. PWs are used to connect the AC AC1 attached to PE1 to the corresponding AC AC2 attached to PE3. Each PW (i.e., PW1, PW2) on the tunnel across PSN1 is stitched to a PW (i.e., PW3, PW4) in the tunnel across PSN2 at PE2 to complete a multi-segment pseudo-wire ("MS-PW") 110, 120 between PE1 and PE3. PE2 is therefore the PW switching point and may be referred to as a PW switching provider edge ("S-PE") S-PE. PW1 and PW3 are segments of the same MS-PW 110 while PW2 and PW4 are segments of another MS-PW 120. PW segments (e.g., PW1 and PW3) of the same MS-PW (e.g., 110) may be of the same PW type or different type, and PSN tunnels (e.g., PSN1 and PSN2) may be the same or different technology. The S-PE switches a MS-PW (e.g., 110) from one segment to another based on the PW identifiers (e.g., PW label in the case of MPLS PWs). Thus, FIG. 1 illustrates a MS-PW 110 providing connectivity from PE1 to PE3 (both T-PEs) through a switching point PE2 (an S-PE).

Figure 2:
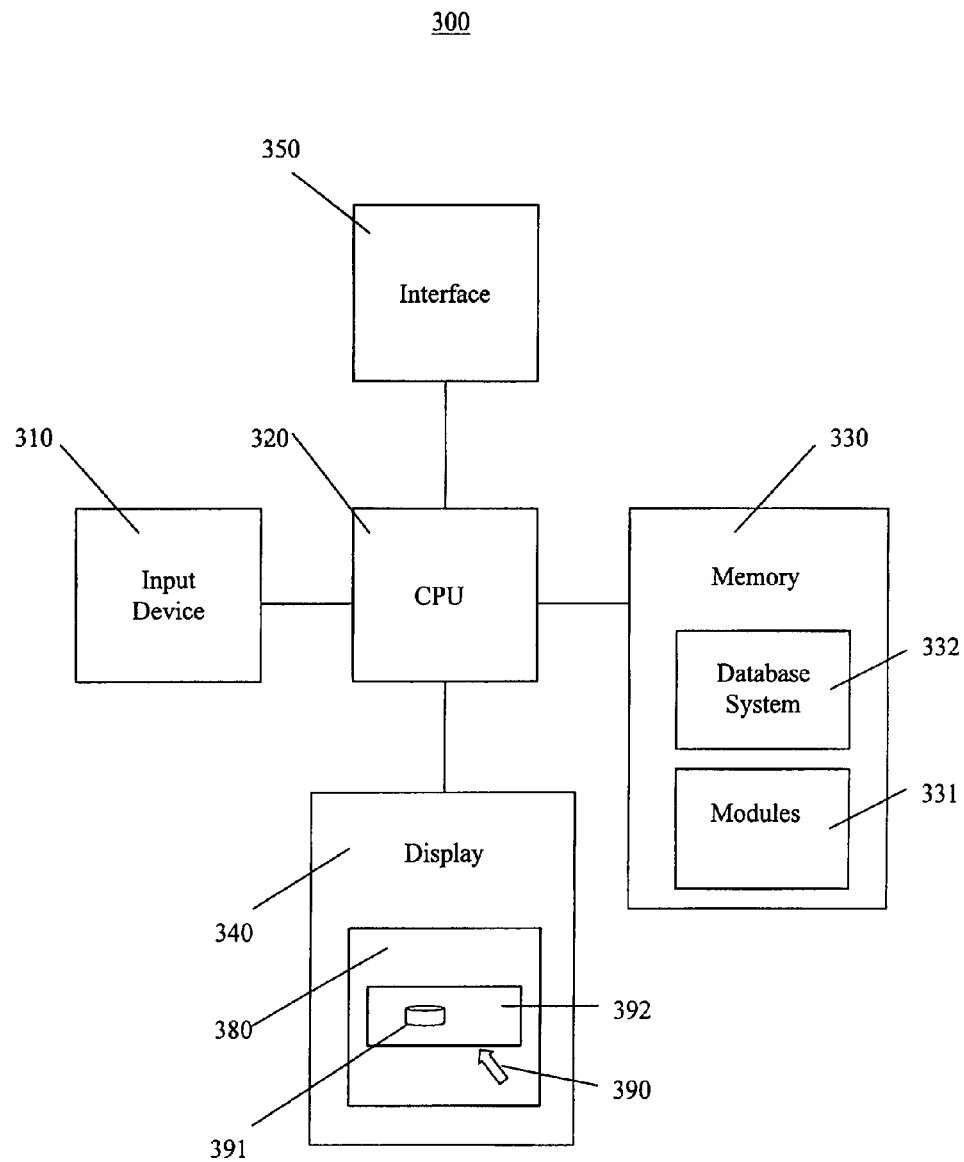
FIG. 2 is a block diagram illustrating a data processing system adapted to implement an embodiment of the invention; and, FIG. 3 is a flow chart illustrating operations of modules within the memory of a data processing system for testing connectivity of a multi-segment pseudo-wire in a network, in accordance with an embodiment of the invention.

FIG. 2 is a block diagram illustrating a data processing system 300 adapted to implement an embodiment of the invention. The data processing system 300 is suitable for operation as a PE device PE1, PE2, PE3, a CE device CE1, CE2, or a NMS. The data processing system 300 includes a central processing unit ("CPU") 320, memory 330, and an interface device 350 and may optionally include an input device 310 and a display 340. The CPU 320 may include dedicated coprocessors and memory devices. The CPU 320 is operatively coupled to memory 330 which stores an operating system (not shown) for general management of the system 300. The memory 330 may include RAM, ROM, disk devices, and databases. The memory 330 may include a variety of storage devices including internal memory and external mass storage typically arranged in a hierarchy of storage as understood to those skilled in the art. The interface device 350 may include one or more network connections. The data processing system 300 is adapted for communicating with other data processing systems (e.g., PE1 and PE3 for PE2) over a network 100, PSN1, PSN2 via the interface device 350. The input device 310 may include a keyboard, a mouse, a trackball, or a similar device. The display 340 may include a computer screen, terminal device, or a hardcopy producing output device such as a printer or plotter. The CPU 320 of the system 300 is typically coupled to one or more input devices 310 for receiving user commands or queries and for displaying the results of these commands or queries to the user on the display 340. Commands and queries may also be received over a network connection and results may be transmitted over a network connection. The data processing system 300 may include a database system 332 for storing and accessing network topology and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules (not shown) or software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable signal or signal-bearing medium that is uploaded to a network 100 by a vendor or supplier of the programmed instructions, and this signal or signal-bearing medium may be downloaded through an interface (e.g., 350) to the data processing system 300 from the network 100 by end users or potential buyers.

Optionally, a user may interact with the data processing system 300 and its hardware and software modules 331 using an optional graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input or pointing device such as a mouse 310. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input or pointing device (e.g., a mouse) 310 to position a pointer or cursor 390 over an object 391 and by "clicking" on the object 391. Typically, a GUI based system presents application, system status, and other information to the user in "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

As mentioned above, for new MS-PW services, methods to easily pinpoint the point of failure and verify the end-to-end connectivity of a MS-PW (e.g., 110 comprised of PW1 and PW3) are deficient. While VCCV allows SPs to test the forwarding datapath of SS-PW services, as PW service is extended to MS-PWs, it is important to maintain the facility to verify the forwarding datapath both end-to-end and for intermediate PW segments. In particular, one problem with present MS-PW networks is that as VCCV packets follow the same path as data packets, it is up to each processing node (e.g., PE2) to identify the VCCV packets. This consumes processing capacity and time at each processing node. The ability to minimize the processing time for each data packet is important for maintaining the line rate for traffic through the overall network 100.

According to one embodiment of the invention, extensions to single-hop VCCV ("SH-VCCV") procedures for segmented pseudo wires are provided for testing the end-to-end forwarding datapath of a MS-PW 110. This is accomplished by changing the adaptation function for the SH-VCCV parameter at the switching point between two distinct PW control planes. Additionally new datapath rules are provided to limit the data packet processing at each router. The datapath method of the invention relies on the ability of each router to forward the packet if the TTL of the inner PW label reaches a value of zero. Referring again to FIG. 1, a MS-PW 110 providing connectivity from PE1 to PE3 (both T-PEs) through the switching point PE2 (an S-PE) is illustrated. By implementing the invention at S-PEs (e.g., S-PE in FIG. 1) in a MS-PW 110, VCCV can be effectively extended to provide both end-to-end and single-segment connection verification.

In FIG. 1, PE1 (i.e., a T-PE) uses the VCCV parameter included in the interface parameter field of the PW ID FEC TLV or the sub-TLV interface parameter of the Generalized PW ID FEC TLV to indicate to the far-end T-PE PE3 what VCCV capabilities PE1 supports. This is the same VCCV parameter as would be used if PE1 and PE3 were connected directly by LDP. PE2 (i.e., an S-PE), which is a PW switching point, as part of the adaptation function for interface parameters, processes locally the VCCV parameter then passes it to PE3. If there were multiple S-PEs on the path between PE1 and PE3, each would carry out the same processing, passing along the VCCV parameter. The local processing of the VCCV parameter removes connectivity check ("CC") types specified by the originating T-PE PE1, except the pseudo wire emulation edge-to-edge ("PWE3") control word that is passed unchanged. For example, if the originating T-PE PE1 indicates that both the PWE3 control word CC type ("Type 1") and the MPLS router alert label CC type ("Type 2") are supported CC types, then the S-PE PE2 removes the MPLS router alert label CC type, leaving the PWE3 control word unchanged, and then passes the modified VCCV parameter to the next S-PE along the path. The far-end T-PE PE3 receives the VCCV parameter indicating the PWE3 control word CC type only if that is supported by the initial T-PE PE1 and all S-PEs PE2 along the PW path.

For reference, within data communication protocols, optional information may be encoded as a type-length-value ("TLV") element inside the protocol. In general, the type and length fields are fixed in size (e.g., 1-4 bytes) and the value field is of variable size. These fields are used as follows: type—a numeric code which indicates the kind of field that this part of the message represents; length—the size of the value field (typically in bytes); and, value—variable sized set of bytes which contains data for this part of the message.

Also for reference, a forwarding equivalence class ("FEC") is a term used in MPLS to describe a set of packets with similar or identical characteristics which may be forwarded in the same way, that is, they may be bound to the same MPLS label.

Note that TLVs for PWs are defined in section 7.2 of RFC 4379. Also note that CC types and connectivity verification ("CV") types are defined in section 4 of IETF draft document "Pseudo Wire Virtual Circuit Connectivity Verification (VCCV)"(draft-ieft-pwe3-vccv-11.txt), October 2006, which is incorporated herein by reference. Further note that the PWE3 control word is defined in IETF document RFC 4385, "Pseudowire Emulation Edge-to-Edge (PWE3) Control Word for Use Over an MPLS PSN", February 2006, which is incorporated herein by reference.

For reference, RFC 4447 defines an interface parameter field in the LDP PW ID FEC (i.e., FEC 128) and an interface parameters TLV in the LDP Generalized PW ID FEC (i.e., FEC 129) to signal different capabilities for specific PWs. An optional sub-TLV parameter is defined to indicate the capability of supporting none, one, or more control channel types for VCCV. This is the VCCV parameter field. If FEC 128 is used, the VCCV parameter field is carried in the interface parameter field. If FEC 129 is used, it is carried as an interface parameter sub-TLV in the interface parameters TLV. RFC 4447 determines whether a PW uses a control word. When a control word is used, section 5.1 of IETF draft document "Pseudo Wire Virtual Circuit Connectivity Verification (VCCV)" prescribes the form that the control word should have for the purpose of indicating VCCV control channel messages.

One advantage of the above method is that it limits the processing of the VCCV messages only to the S-PE/T-PE node which is the target for the message. All other S-PE nodes in between are not required to inspect the VCCV control word and are only required to decrement the TTL of the PW label. Furthermore, it provides a model of operation consistent with the operation of MPLS LSP ping and LSP trace.

Single-hop VCCV adaptation for end-to-end verification according to one embodiment of the invention will now be described. Note that with respect to in-band VCCV using a control word, in FIG. 1, if T-PE1, S-PE and T-PE2 support the control word for VCCV, then the control plane negotiates the common use of the control word for VCCV end-to-end. At S-PE, the data path operations include an outer label pop, an inner label (i.e., the PW label) swap, and a new outer label push. Note that there is no requirement for the S-PE to inspect the control word. Thus, the end-to-end connectivity of the MS-PW 110 can be verified by: (a) setting the PWE3 control word CC type in the VCCV parameter sent by each T-PE; (b) by each S-PE maintaining the control word CC type in the VCCV parameter; (c) setting the inner PW label TTL to a large enough value to allow the packet to reach the far end; and, (d) by the T-PE sending a VCCV packet that will follow the exact same datapath at each S-PE as that taken by data packets, and that will be diverted to VCCV control processing at the destination T-PE.

Single-hop VCCV adaptation for partial tracing from a T-PE according to one embodiment of the invention will now be described. In order to trace part of the MS-PW 110, the TTL of the PW label may be used to force the VCCV message to "pop out" at an intermediate node. When the TTL expires, the S-PE can determine that the packet is a VCCV packet by checking the control word. If the control word format matches that specified in IETF draft document "Pseudo Wire Virtual Circuit Connectivity Verification (VCCV)"(see above), the packet is diverted to VCCV processing. In FIG. 1, if T-PE1 sends a VCCV message with the TTL of the PW label equal to 1, the TTL will expire at S-PE. T-PE1 can thus verify the first segment PW1 of the MS-PW 110. Note that this use of the TTL is subject to the caution expressed in IETF draft document "Pseudo Wire Virtual Circuit Connectivity Verification (VCCV)" (see above). If a penultimate LSR between S-PEs or between an S-PE and a T-PE manipulates the PW label TTL, the VCCV message may not emerge from the MS-PW 110 at the correct S-PE. It is also a requirement that each S-PE decrement the PW label TTL correctly.

With respect to VCCV between S-PEs, assuming that all nodes along an MS-PW 110 support the control word CC Type, VCCV between S-PEs may be accomplished using the PW label TTL as described above. In FIG. 1, S-PE may verify the path between itself and T-PE2 by sending a VCCV message with the PW label TTL set to 1. Given a more complex network with multiple S-PEs, a S-PE may verify the connectivity between it and a S-PE two segments away by sending a VCCV message with the PW label TTL set to 2.

To reiterate, to verify the whole datapath, a T-PE (e.g., PE1) sends a VCCV ping to the other T-PE (e.g., PE3), including a VCCV control word and setting the TTL of the inner PW label to a high value (e.g., 255). At each S-PE (e.g., PE2), the TTL of the PW label is decremented and the packet is passed along. When the packet arrives at the destination T-PE PE3, the MPLS label stack is removed and the packet is forwarded to the control plane for VCCV processing, so that a reply can be generated. Note that the transit S-PEs (e.g., PE2) ignore the VCCV control word because the TTL of the PW label has not expired. Only the terminating T-PE PE3 processes the control word.

To verify a segment of the datapath, a T-PE (e.g., PE1) sends a VCCV ping, setting the TTL of the PW label to a number equal to the number of segments that it wants to traverse. For example, to test the datapath between the T-PE PE1 and the first S-PE PE2, the T-PE PE1 sets the PW label TTL to 1. At the first S-PE PE2, the PW label TTL expires and the packet is forwarded to the control plane for VCCV processing and reply. To test the datapath between the T-PE PE1 and the second S-PE (not shown), the T-PE PE1 sets the PW label TTL to 2. The first S-PE PE2 decrements the VC label TTL and passes the packet along without processing it. The VC label TTL expires at the second S-PE and this router will process the packet.

According to one embodiment, the method may be initiated by a user through the GUI 380 of the data processing system 300 (e.g., by entering a corresponding command, by clicking on an corresponding icon 391, by selecting a corresponding item from a menu, etc.) and the results of the method may be displayed to the user on the data processing system's display screen 340. According to another embodiment, the method may be initiated automatically.

The present invention provides several advantages. First, it provides a reduction in real-time processing for each packet. Each router that participates in segment PW processing already performs a TTL decrement of the inner PW label. The present invention indicates that based on the TTL value of the inner PW label the packet can be considered a VCCV packet. This provides a reduction in processing compared to existing methods which require a deeper packet inspection and an additional TTL decrement. Note also that the processing of VCCV packets and data packets at S-PEs is exactly the same, so the VCCV packets are tracing the exact same datapath as the data packets. No special case processing occurs at the S-PEs. Note that if the S-PEs use penultimate hop popping for their outer tunnels, there is a risk that the penultimate router before each S-PE may incorrectly decrement the PW label TTL. This does not affect end-to-end ping functionality, but may make the verification of segments of the path more difficult to carry out. To implement the method of the present invention, each router needs to properly respond to the control plane protocol. In addition, by sending a VCCV packet with the appropriate inner TTL value, a router that implements the method of the present invention may respond to the VCCV message.

Figure 3:
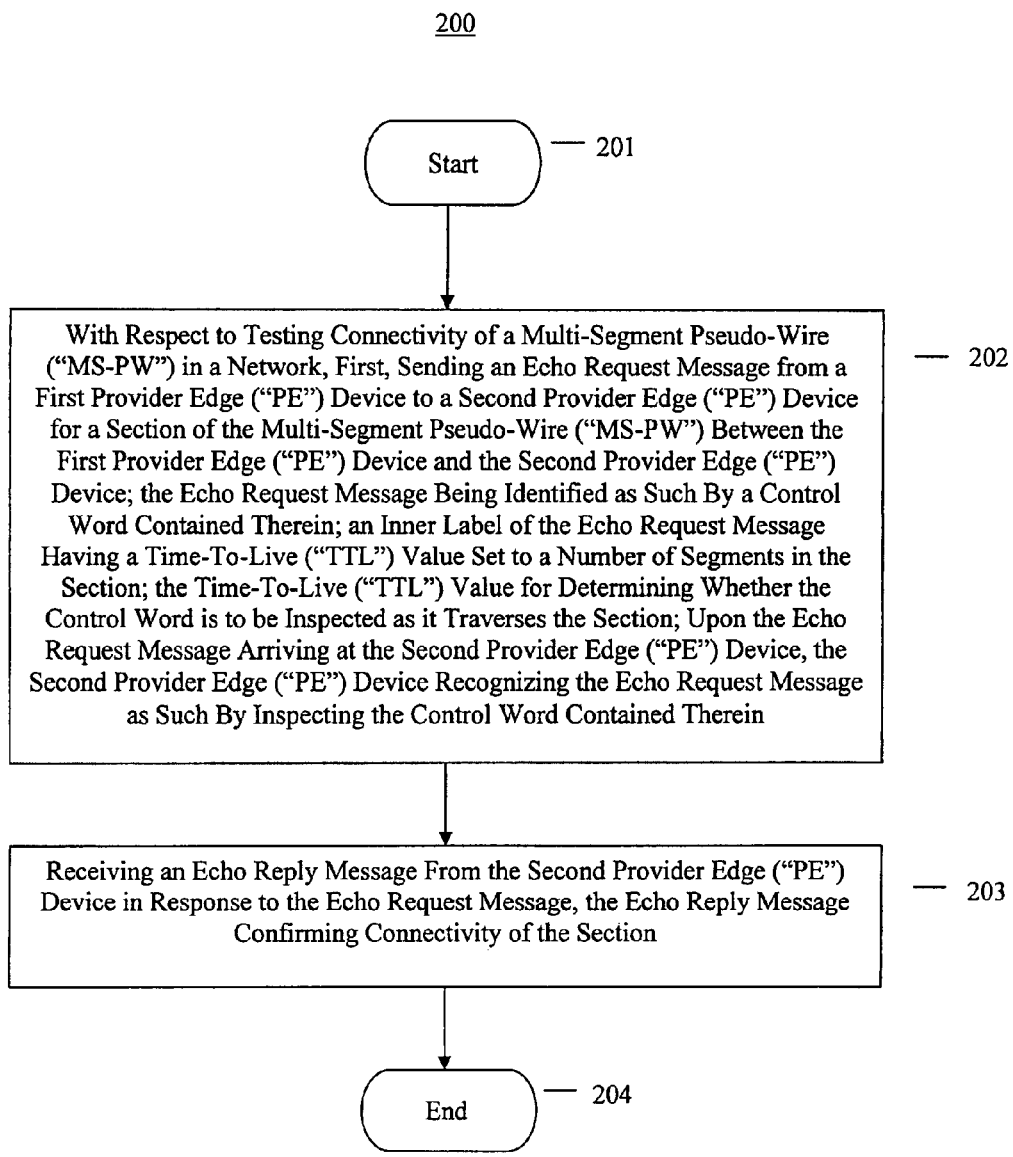

Aspects of the above described method may be summarized with the aid of a flowchart. FIG. 3 is a flow chart illustrating operations 200 of modules 331 within the memory 330 of a data processing system 300 for testing connectivity of a multi-segment pseudo-wire ("MS-PW") (e.g., 110) in a network 100, in accordance with an embodiment of the invention.

At step 201, the operations 200 start.

At step 202, an echo request message is sent from a first provider edge ("PE") device (e.g., PE1) to a second provider edge ("PE") device (e.g., PE3) for a section PW1, PW3 of the multi-segment pseudo-wire ("MS-PW") 110 between the first provider edge ("PE") device PE1 and the second provider edge ("PE") device PE3; the echo request message being identified as such by a control word contained therein; an inner label of the echo request message having a time-to-live ("TTL") value set to a number of segments (e.g., 2) in the section PW1, PW3; the time-to-live ("TTL") value for determining whether the control word is to be inspected as it traverses the section PW1, PW3; upon the echo request message arriving at the second provider edge ("PE") device PE3, the second provider edge ("PE") device PE3 recognizing the echo request message as such by inspecting the control word contained therein.

At step 203, an echo reply message is received from the second provider edge ("PE") device PE3 in response to the echo request message, the echo reply message confirming connectivity of the section PW1, PW3.

At step 204, the operations 200 end.

In the above method, the inner label may be an inner pseudo-wire ("PW") label. The echo request message may have an outer tunnel label for traversing the network 100. The control word may be a virtual circuit connectivity verification ("VCCV") control word. The time-to-live ("TTL") value (e.g., 2) may be decremented upon traversing each segment (e.g., PW1) of the section PW1, PW3 of the multi-segment pseudo-wire ("MS-PW") 110. The first provider edge ("PE") device PE1 may be a first terminating provider edge ("T-PE") device T-PE1. The second provider edge ("PE") device PE3 may be a second terminating provider edge ("T-PE") device T-PE2. The time-to-live ("TTL") value may be set to a number (e.g., 3) that is greater than or equal to the number of segments (e.g., 2) in the section PW1, PW3 of the multi-segment pseudo-wire ("MS-PW") 110. The second provider edge ("PE") device PE2 may be a switching provider edge ("S-PE") device S-PE. And, the time-to-live ("TTL") value may be set to a number that is less than the number of segments in the section and the control word may be inspected by the switching provider edge ("S-PE") device S-PE if the time-to-live ("TTL") value (e.g., 1) is decremented to zero at the switching provider edge ("S-PE") device S-PE.

According to one embodiment, the network 100 is a multiprotocol label switching ("MPLS") network and the outer tunnel label is an outer MPLS tunnel label. According to another embodiment, the tunnel is an Internet Protocol ("IP") tunnel (e.g., a generic routing encapsulation ("GRE") tunnel or a MPLS-in-IP tunnel). According to another embodiment, the tunnel is an Ethernet tunnel (e.g., Provider Backbone Transport ("PBT")).

According to one embodiment of the invention, the above described method may be implemented by a NMS (not shown) rather than by, or in combination with, the PEs PE1, PE2, PE3, 300.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 can be contained in a data carrier product according to one embodiment of the invention. This data carrier product can be loaded into and run by the data processing system 300. In addition, the sequences of instructions which when executed cause the method described herein to be performed by the data processing system 300 can be contained in a computer software product (e.g., software modules) according to one embodiment of the invention. This computer software product can be loaded into and run by the data processing system 300. Furthermore, the sequences of instructions which when executed cause the method described herein to be performed by the data processing system 300 can be contained in an integrated circuit product (e.g., hardware modules, a field programmable gate array ("FPGA"), an application specific integrated circuit ("ASIC"), etc.) including a coprocessor or memory according to one embodiment of the invention. This integrated circuit product can be installed in the data processing system 300.

The embodiments of the invention described above are intended to be exemplary only. Those skilled in this art will understand that various modifications of detail may be made to these embodiments, all of which come within the scope of the invention.

What is claimed is:

1. A method for testing connectivity of a multi-segment pseudo-wire ("MS-PW") in a network, the method comprising:
    sending an echo request message from a first provider edge ("PE") device to a second device for a section of the MS-PW between the first PE device and the second PE device to confirm connectivity of the section of the MS-PW;
    identifying, with a processor, the echo request message by a control word contained therein, wherein an inner label of the echo request message has a time-to-live ("TTL") value set to a number of segments in the section of the MS-PW and the TTL value determines whether the processor inspects the control word as it traverses the section of the MS-PW;
    upon the echo request message arriving at the second PE device, the second PE device recognizing the echo request message by inspecting the control word contained therein; and,
    receiving, in the first PE device, an echo reply message from the second PE device in response to the echo request message, the echo reply message confirming connectivity of the section of the MS-PW.

2. The method of claim 1, wherein the inner label is an inner pseudo-wire ("PW") label.

3. The method of claim 2, wherein the echo request message has an outer tunnel label for traversing the network.

4. The method of claim 3, wherein the control word is a virtual circuit connectivity verification ("VCCV") control word.

5. The method of claim 1, wherein the TTL value is decremented upon traversing each segment of the section of the MS-PW.

6. The method of claim 5, wherein the first PE device is a first terminating provider edge ("T-PE") device.

7. The method of claim 6, wherein the second PE device is a second terminating provider edge ("T-PE") device.

8. The method of claim 7, wherein the TTL value is set to a number that is greater than or equal to the number of segments in the section of the MS-PW.

9. The method of claim 6, wherein the second PE device is a switching provider edge ("S-PE") device.

10. The method of claim 9, wherein the TTL value is set to a number that is less than the number of segments in the section and the control word is inspected by the S-PE device if the TTL value is decremented to zero at the S-PE device.

11. A system for testing connectivity of a multi-segment pseudo-wire ("MS-PW") in a network, the system comprising:
    a processor coupled to memory and to an interface to the network; and, modules within the memory and executed by the processor, the modules including:
    a module for sending an echo request message from the system to a second provider edge ("PE") device for a section of the MS-PW between the system and the second PE device to confirm connectivity of the section of the MS-PW, wherein the processor identifies the echo request message by a control word contained therein, an inner label of the echo request message has a time-to-live ("TTL") value set to a number of segments in the section of the MS-PW, the TTL value determines whether the processor inspects the control word as it traverses the section of the MS-PW, and upon the echo request message arriving at the second PE device, the second PE device recognizes the echo request message by inspecting the control word contained therein; and,
    a module, in the first PE device, for receiving an echo reply message from the second PE device in response to the echo request message, the echo reply message confirming connectivity of the section of the MS-PW.

12. The system of claim 11, wherein the inner label is an inner pseudo-wire ("PW") label.

13. The system of claim 12, wherein the echo request message has an outer tunnel label for traversing the network.

14. The system of claim 13, wherein the control word is a virtual circuit connectivity verification ("VCCV") control word.

15. The system of claim 11, wherein the TTL value is decremented upon traversing each segment of the section of the MS-PW.

16. The system of claim 15, wherein the system is a first terminating provider edge ("T-PE") device.

17. The system of claim 16, wherein the second PE device is a second terminating provider edge ("T-PE") device.

18. The system of claim 17, wherein the TTL value is set to a number that is greater than or equal to the number of segments in the section of the MS-PW.

19. The system of claim 16, wherein the second PE device is a switching provider edge ("S-PE") device.

20. The system of claim 19, wherein the TTL value is set to a number that is less than the number of segments in the section and the control word is inspected by the S-PE device if the TTL value is decremented to zero at the S-PE device.

* * * * *